May 28, 1929.  H. SWANSON  1,714,644
HOIST FOR MOTOR VEHICLES
Filed June 2, 1927  2 Sheets-Sheet 2
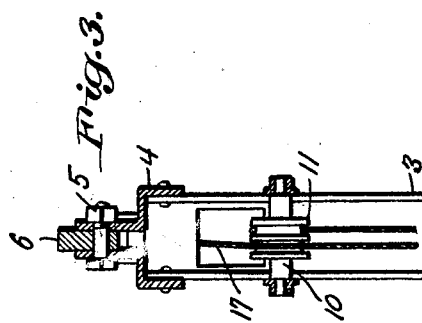
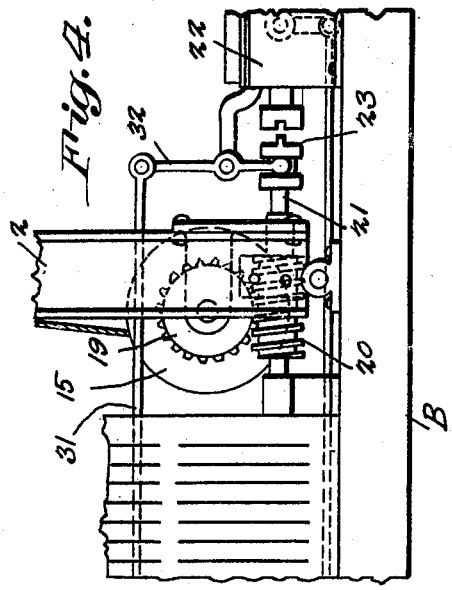
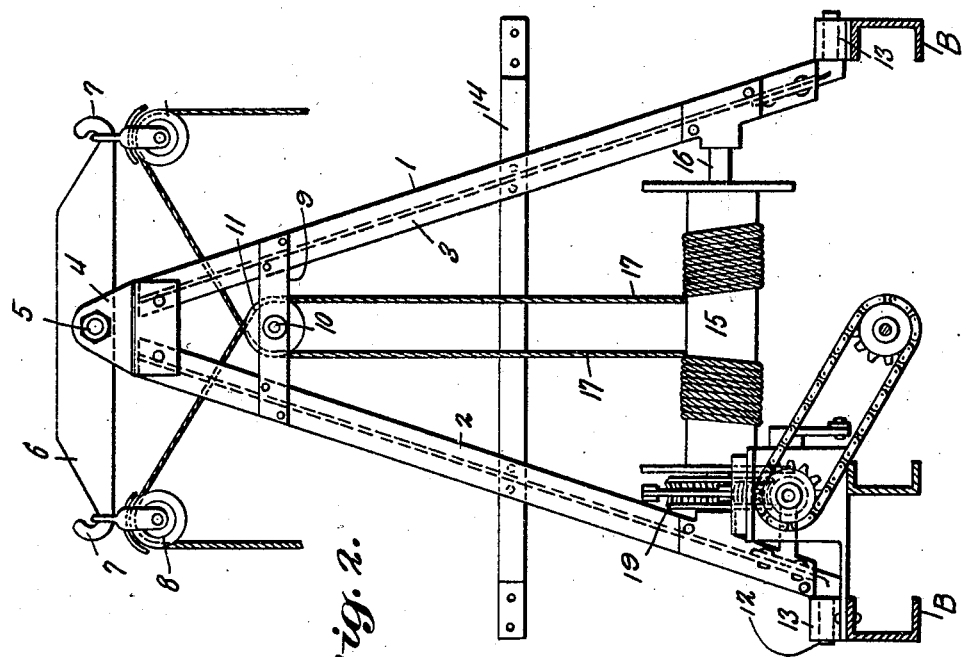
Harry Swanson, INVENTOR.
Witnesses Patented May 28, 1929.

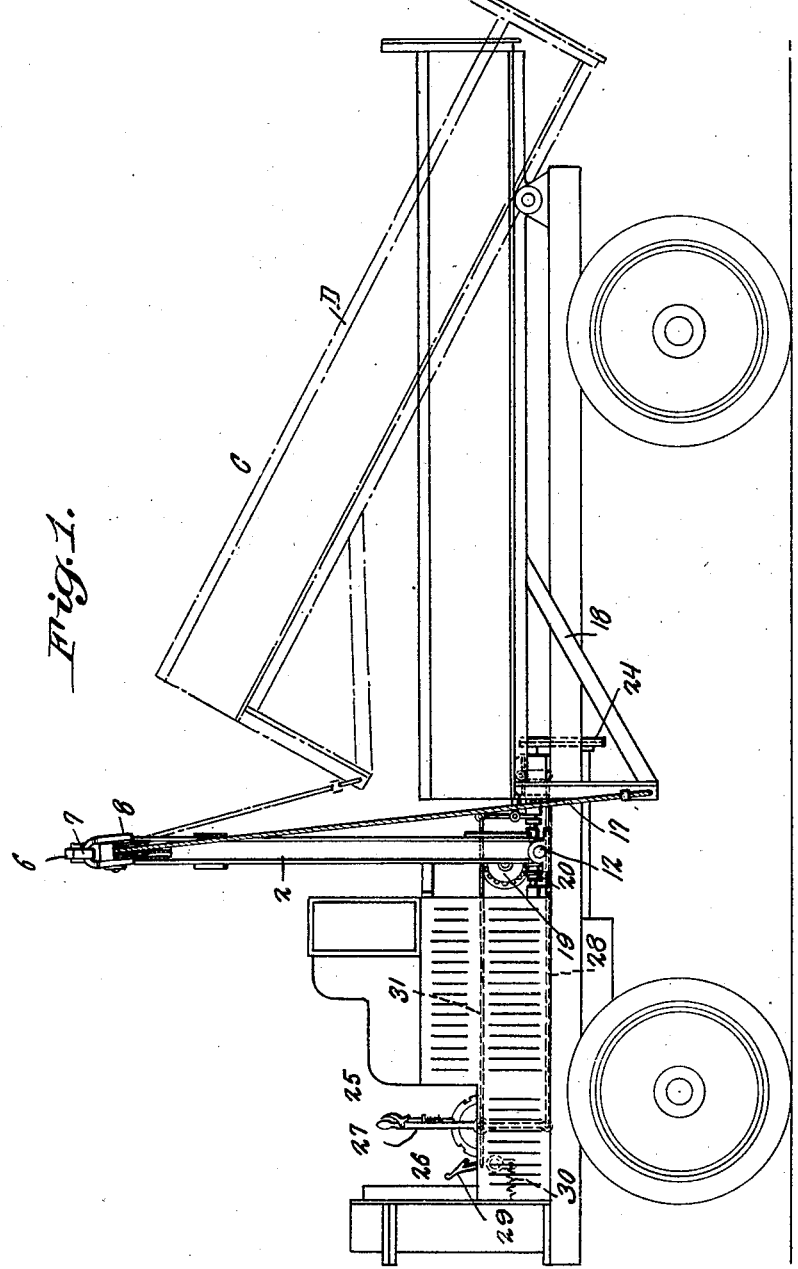

UNITED STATES PATENT OFFICE.

1,714,644

HARRY SWANSON, OF RENO, NEVADA.

HOIST FOR MOTOR VEHICLES.

Application filed June 2, 1927. Serial No. 196,070.

This invention relates to a hoist construction, and more particularly to a construction for application to a motor vehicle with which the power of the motor may be utilized to lift considerable weight.

An object of the invention is the construction of a hoist that may be quickly and substantially mounted on the various types of motor vehicles now in use, and when in applied position may be directly coupled to the engine so that the rapidity of pull of the lift may be manually controlled according to the will of the operator.

Another object of the invention is the manner of designing and substantially connecting the various component parts so that the hoist may efficiently operate under various conditions and which is capable of withstanding all the usual strains to which an apparatus of this character is subject when in use.

Still another object of the invention is the construction of a hoist incorporating therein a pair of companion control mechanisms whereby the direction and speed of travel of the hoist may be controlled and the time of operations be under the positive control of the operator.

Besides the above, my invention is distinguished in the novel construction of a frame supporting in a novel manner various other parts which combine to cause the travel of the cables in the proper direction to reduce friction to a minimum.

With these and other objects in view, my invention will be better understood from a description of the same when taken in connection with the accompanying drawings, wherein:—

Figure 1 is a side elevation of my improved hoist installed upon a motor vehicle of the truck type;

Figure 2 is a rear elevation of the hoist;

Figure 3 is a vertical sectional view through the cross head and its associated parts;

Figure 4 is a side elevation of the operating mechanism for the drum.

Again referring to the drawings, the numeral 1 designates a frame constructed from a pair of upwardly extending, divergently arranged beams 2 and 3, the upper ends of which are securely bound together by the opposing bearing plates 4 carrying the pivot bolt 5. The intermediate portion of a cross head 6 is mounted on this pivot bolt 5 so that the cross beam may rock in a vertical direction to adjust itself according to the load. The ends of the cross beam are formed into hooks 7 for suspending the pulleys 8 that are horizontally spaced apart and arranged on opposite sides of the frame. Cross bars 9 bind the beams together at a point below the bearing plates and these bars 9 support an axle 10 upon which are mounted the guide rollers 11, shown in this particular instance as two in number corresponding to the number of pulleys. The lower ends of the beams are rigidly secured to stub shafts 12 journaled in the bearings 13 that are rigidly secured to the body beams B of the motor vehicle C, shown in this particular instance as of the truck type, and including the pivoted body D. By this construction it will be appreciated that the frame may be given a limited swinging movement to properly adjust itself to accommodate the proper attachment of the brace 14 to a stationary portion of the truck.

As far as I have proceeded, it will be appreciated that I have provided a very substantial construction of frame in which the component parts are so connected as to facilitate the installation of the frame upon the many makes of trucks now on the market or other types of motor vehicles, and during this installation of the frame various adjustments may be quickly and properly accomplished. A drum 15 mounted on the main shaft 16 journaled in the beam has wrapped therearound the cables 17 that are guided around the guide rollers 11 so as to cross each other at an angle to be properly passed around the pulleys 8. By this arrangement the cables will parallel each other for a portion of their travel centrally of the frame and will then extend directly to the pulleys so that the direction of travel may be changed to accomplish the proper connection with the bracket 18 that is rigidly secured to the body D and accomplish this result in such a manner that resistance or friction is reduced to a minimum.

Various types of mechanisms may be used for operating the drum, which in certain instances may be manually operated and in other instances mechanically operated by the motor of the vehicle. In the drawings, I have illustrated power mechanism for operating the hoist, which mechanism is of a novel construction so as to enable the hoist to be power operated in either direction of travel, the speed of which is accurately controlled. To accomplish this desired result, the shaft 16 has mounted thereon a worm wheel 19 that is in constant mesh with a worm 20 tangentially arranged, thereby acting in the capacity of a lock device for preventing accidental movement of the cables. This worm 20 is mounted on a drive shaft 21 that is connected with or disconnected from the transmission mechanism, diagrammatically illustrated at 22, by means of the clutch 23. This transmission mechanism 22, which may be of two or more speeds or capable of forward and reverse motion, receives its power from the motor by the drive connection 24.

For the purpose of controlling the direction of travel of the cables, their rate of travel and the interval of operation, I provide the companion control devices 25 and 26, the former consisting of a control lever 27 connected to a control rod 28 that extends to the transmission mechanism to accomplish the operation thereof in a manner well known in the art. The control device 26 consists of a foot operated pedal 29 held in a predetermined position by the spring 30 and pivotally connected to a control rod 31 that extends to the fork 32 that operates the heretofore mentioned clutch 23.

From the foregoing description taken in connection with the accompanying drawings, it will be appreciated that I provide a hoist construction substantial throughout and which may be quickly applied to the body of the motor vehicle to be quickly and conveniently operated by the driver of the vehicle through the design and location of the control devices. This is brought about by connecting the drum 15 directly with the motor of the vehicle through the transmission mechanism, which is controlled by the lever 27, and controlling the action of the transmission mechanism upon the drum through the use of the pedal 29 which is capable of connecting or disconnecting the frame from the operating mechanism.

In concluding, I wish to lay considerable stress upon the novel arrangement of the operating mechanism and the novel travel of the cables so that considerable power can be applied to the cables and from the cables to the object to be lifted without any possibility of a large portion of this transmission mechanism being consumed in its transmission to the seat of operation. This reduction in waste energy and the simplicity of construction and operation of the various parts considerably increases the life of the apparatus as a whole and enables a single type of hoist to have a wide range of operation so as to take care of a wide range of load.

It is, of course, to be understood that the relative arrangement of the parts and their cooperative connection may be changed in various other manners than illustrated and, therefore, I do not desire to be limited in any manner except as set forth in the following claim.

I claim:—

In a hoist construction, a pair of upwardly extending converging beams, means mounting the lower ends of the beams, plates rigidly securing the upper ends of the beams together, cross bars extending between the beams at a point below the plates, guide rollers supported by the cross bars, a cross beam having its intermediate portion pivotally mounted between said plates and having its ends terminating in hooks, pulleys suspended from said hooks, a drum journaled upon the beams, and cables wound around the drum and led over said guide rollers in crossing relation to each other and extended over said pulleys.

In testimony whereof I affix my signature.

HARRY SWANSON.